United States Patent
Sekiguchi et al.

(10) Patent No.: US 6,670,083 B2
(45) Date of Patent: Dec. 30, 2003

(54) COLOR FILTER AND LIQUID CRYSTAL DISPLAY PROVIDED THEREWITH

(75) Inventors: Shinji Sekiguchi, Tokyo (JP); Jun Tanaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 32 days.

(21) Appl. No.: 10/160,228

(22) Filed: May 28, 2002

(65) Prior Publication Data

US 2002/0150826 A1 Oct. 17, 2002

Related U.S. Application Data

(62) Division of application No. 09/964,976, filed on Sep. 26, 2001.

(30) Foreign Application Priority Data

Dec. 8, 2000 (JP) ......................................... 2000-379761

(51) Int. Cl.[7] ........................... G02B 5/20; G02F 1/1335
(52) U.S. Cl. .......................................................... 430/7
(58) Field of Search ............................ 430/7; 349/106; 359/891

(56) References Cited

U.S. PATENT DOCUMENTS 6,358,652 B1 * 3/2002 Tomiuchi et al. ............... 430/7
2002/0011971 A1 * 1/2002 Hamamoto et al. ........... 345/32

FOREIGN PATENT DOCUMENTS

| JP | 63-293532 A | * 11/1988 |
| JP | 10-255983 A | * 9/1998 |
| JP | 11-202118 | 7/1999 |

* cited by examiner

Primary Examiner—John A. McPherson
(74) Attorney, Agent, or Firm—Townsend and Townsend and Crew LLP

(57) ABSTRACT

Disclosed is a color filter which has a flattening layer that functions also as a wavelength converting layer. The wavelength converting layer converts that portion of light incident to the color filter layer which is in the near ultraviolet region into light having a wavelength longer than the blue region. Thus the red, green, and blue filter segments are improved in light transmittance. In this way it is possible to realize a color filter and a liquid crystal display unit having a high light transmittance and good display characteristics.

9 Claims, 12 Drawing Sheets

COLOR FILTER AND LIQUID CRYSTAL DISPLAY PROVIDED THEREWITH

CROSS-REFERENCES TO RELATED APPLICATIONS

This application is a divisional application of U.S. application Ser. No. 09/964,976, filed Sep. 26, 2001, which is related to and claims priority from Japanese Patent Application No. 2000-379761, filed on Dec. 8, 2000.

BACKGROUND OF THE INVENTION

The present invention relates to a color filter to be used for a liquid crystal display unit capable of color display. The present invention relates also to a color liquid crystal display unit provided with said color filter, and more particularly, to a color liquid crystal display unit having improved display quality and increased brightness of light passing through the color filter from the back light for liquid crystal.

Display units, typified by liquid crystal display units, to display character and image information are available in a variety of types capable of color display. A common way to realize the color display is to use a color filter.

The conventional color filter consists of a glass substrate and color patterns formed thereon. The patterns are colored in red (R), green (G), and blue (B) with a pigment or dye. The color filter of this type selectively transmits light in a specific wavelength region and absorbs (or screens) light outside the specific wavelength region. This leads to the disadvantage that the transmittance of light through the color filter is low.

For example, in the case of an RGB color filter, the filter for blue color absorbs light in the wavelength region corresponding to red color and green color in the incident white light and transmits blue color. This causes more than two thirds of the amount of incident light to be lost.

A color filter to tackle the above-mentioned problem was disclosed in Japanese Patent Laid-open No. 202118/1999. As schematically shown in FIG. 1, this color filter consists of a glass substrate 4, two filter layers 2, 3, and a flattening layer 1. The first filter layer 3 is laminated on that side of the glass substrate 4 from which light 11 emerges. The first filter layer consists of plural wavelength converting segments 3R, 3G, and 3B for red, green, and blue colors, respectively. The second filter layer 2 is laminated on that side of the first filter layer from which light emerges. The second filter layer consists of plural filter segments 2R, 2G, and 2B. The flattening layer 1 is intended to make flat the two layers laminated on top of the other.

The wavelength converting segments 3R convert light in the wavelength in the range from near ultraviolet to green into light in the wavelength region of red. The wavelength converting segments 3G convert light in the wavelength in the range from near ultraviolet to blue into light in the wavelength region of green. The wavelength converting segments 3B convert light in the wavelength in the range from near ultraviolet into light in the wavelength region of blue.

The liquid crystal display unit provided with the above-mentioned wavelength converting filter has the following disadvantage. In addition to the respective filter segments (2R, 2G, 2B) for red, green, and blue, it is essential to form the wavelength converting segments (3R, 3G, 3B) that convert the wavelength of incident light corresponding to the respective colors. This leads to an increase in steps for the production of color filter and also leads to a decrease in productivity of color filter.

Moreover, it is also necessary to form the segments comprising the color filtering layer by several steps after the wavelength converting layer has been formed. The severe heat history in these steps affects the segments comprising the wavelength converting layer underneath, which tends to deteriorate the function of the wavelength converting layer.

There is a need to address the above-mentioned problems. It is desirable to provide a color filter which has a high transmittance for incident light. It is further desirable to provide a color liquid crystal display unit capable of display with high brightness.

SUMMARY OF THE INVENTION

In accordance with an aspect of the invention, a color filter comprises a laminated structure having a substrate layer, color filter layer comprising plural filter segments, and a wavelength converting layer. The wavelength converting layer is co-extensive with the color filtering layer and comprises a material having the property of producing emergent light comprising a first range of frequencies in response to receiving incident light comprising a second range of frequencies.

In accordance with another aspect of the invention, a color filter comprises a laminated structure having a substrate layer, a color filtering layer comprising plural color filter segments, a first wavelength converting layer comprising plural first and second wavelength converting segments, and a second wavelength converting layer co-extensive with the color filter layer. The first wavelength converting segments produce first emergent light having a first range of wavelengths greater than a first wavelength value in response to receiving a first portion of incident light having wavelengths less than the first wavelength value. The second wavelength converting segments produce second emergent light having a second range of wavelengths greater than a second wavelength value in response to receiving a second portion of the incident light having wavelengths less than the second wavelength value. The second wavelength converting layer is a single layer of material which produces third emergent light having a third range of wavelengths greater than a third wavelength value in response to receiving a third portion of the incident light having wavelengths less than the third wavelength value.

In accordance with still another aspect of the invention, the foregoing aspects of the color filter are incorporated in a liquid crystal display device comprising a pair substrates. Disposed between the pair of substrates are a liquid crystal layer, a layer of transistor elements, and the foregoing described color filter.

BRIEF DESCRIPTION OF THE DRAWINGS

These and other features, objects and advantages of the present invention will become more apparent from the following description when taken in conjunction with the accompanying drawings wherein.

DESCRIPTION OF THE SPECIFIC EMBODIMENTS

Figure 1:
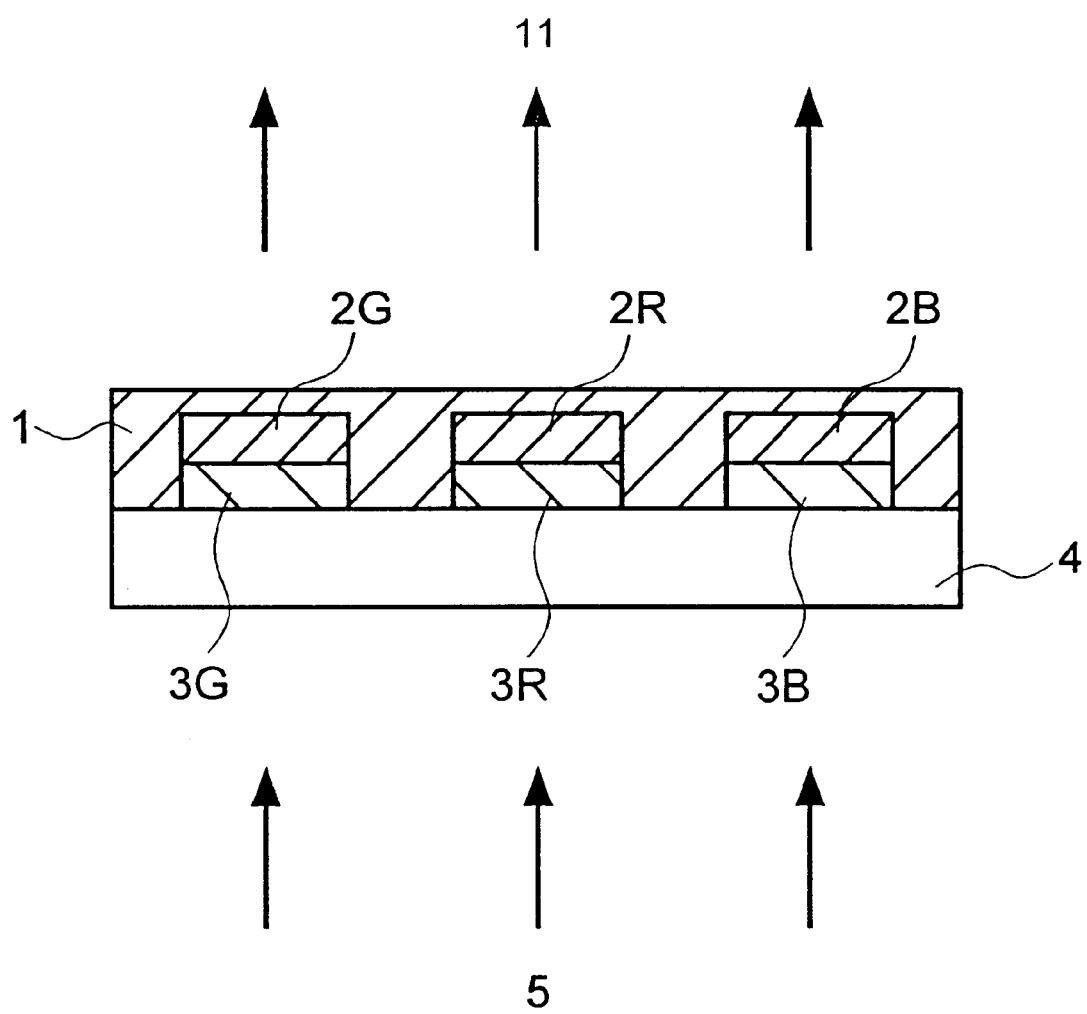
FIG. 1 is a sectional view illustrating a conventional color filter.

Following are brief descriptions of various illustrative examples of the various embodiments of the invention.

The present invention in accordance with an illustrative embodiment includes a color filter which comprises a light-transmitting substrate, a color filter layer, and a wavelength converting layer, said wavelength converting layer covering said color filter layer.

The present invention in accordance with another illustrative embodiment includes a color filter which comprises a light-transmitting substrate and a wavelength converting layer, a color filter layer, and a flattening layer which are sequentially laminated thereon so that incident light having a wavelength shorter than 420 nm is converted into light having a wavelength longer than 420 nm.

The present invention in accordance with still another illustrative embodiment includes a color filter which comprises a light-transmitting substrate, a wavelength converting layer, a black matrix layer, a color filter layer, and flattening layer, said wavelength converting layer and said color filter layer being laminated on said light-transmitting substrate, said black matrix layer being arranged in the gap between adjacent color filters, and said flattening layer covering said black matrix layer and said color filter layer.

The present invention in accordance with yet another illustrative embodiment includes a liquid crystal display unit which comprises a first light-transmitting substrate, thin-film transistor elements, a liquid crystal layer, and a color filter, said color filter comprising a second light-transmitting substrate and a color filter layer and a wavelength converting layer sequentially laminated thereon, with said liquid crystal layer being arranged between said thin-film transistor elements and said wavelength converting layer.

The present invention in accordance with another illustrative embodiment includes a liquid crystal display unit which comprises a first light-transmitting substrate, thin-film transistor elements, a liquid crystal layer, and a color filter, said color filter comprising a second light-transmitting substrate and a wavelength converting layer and a color filter sequentially laminated thereon, with said liquid crystal layer being arranged between said thin-film transistor elements and said color filter layer.

The present invention according to still another embodiment includes a liquid crystal display unit which comprises a light-transmitting substrate, thin-film transistor elements, a wavelength converting layer, a color filter layer, and a liquid crystal layer, with said color filter layer, which is formed on said wavelength converting layer, being arranged between said thin-film transistor elements and said liquid crystal layer.

The liquid crystal display unit is constructed such that the wavelength converting layer converts incident light having a wavelength shorter than 420 nm into light having a wavelength longer than 420 nm. The liquid crystal display unit is also constructed such that the light from the back light enters the color filter layer through the wavelength converting layer.

The above-mentioned illustrative embodiments of a color filter according to the present invention flattens the wavelength converting layer and the resist layer and also transmits only incident light in a specific wavelength region. (The wavelength converting layer converts part of incident light into light in a specific wavelength region. Each filter layer of the wavelength converting layer is formed on the resist layer.)

The above-mentioned structures obviate the necessity of forming filter layers individually for red, green, and blue and the necessity of forming new wavelength converting layer individually in the same pattern as the filter layer. The flattening of individual filter layers and the function of wavelength conversion can be achieved simultaneously. This obviates the necessity of increasing the number of manufacturing steps. The ability to convert incident light having a wavelength shorter than 420 nm into light having a wavelength longer than 420 nm leads to a color display liquid crystal unit having a high light transmittance.

The wavelength converting layer employs a fluorescent material such as 7-dimethylamino-4-methylcoumarin, 7-hydroxy-4-methylcoumarin, perylene, 1,4-bis(4-methyl-5-phenylxazol-2-yl)benzene, and 7-dimethylamino-4-methyl-2-hydroxyquinoline. Any other ones may be used so long as they convert incident light having a wavelength shorter than 420 nm into light having a wavelength longer than 420 nm.

The foregoing described embodiments of the present invention are described below in greater detail with reference to the accompanying drawings.

Figure 2:
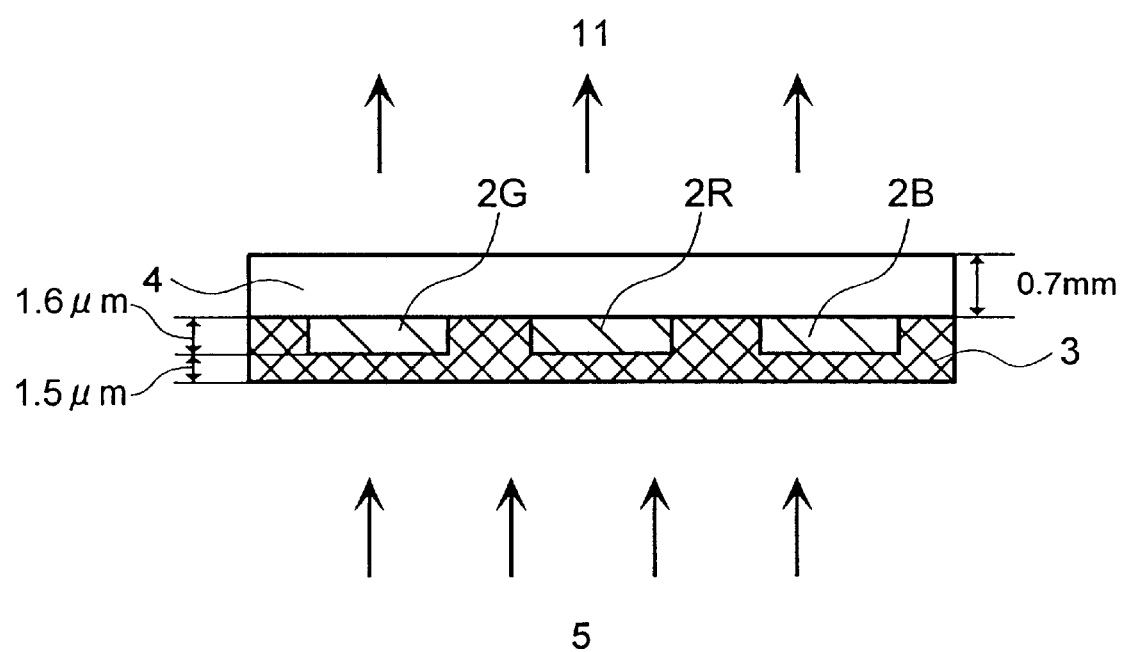
FIG. 2 is a sectional view illustrating a color filter according to one embodiment of the present invention.

FIG. 2 is a sectional view diagrammatically illustrating a color filter according to an example of one embodiment of the present invention. The relative dimensions are shown exaggerated for illustrative purposes. There is shown a glass substrate 4 (e.g., about 0.7 mm thick). The glass substrate 4 is coated in the usual way with a resist containing a red pigment dispersed therein. Coating is followed by baking. The resist undergoes exposure, development, and post-baking according to the well-known technology of lithography. In this way there is formed the patterned red filter segments 2R (e.g., about 1.6 μm thick) at the desired positions. The same step are repeated to form the green filter segments 2G and the blue filter segments 2B. The resulting substantially coplanar color segments constitute the color filtering layer designated collectively as 2R, 2G, and 2B.

The surface of the color filtering layer 2R, 2G, and 2B is flattened with a flattening layer 3, which is formed from a photo-thermosetting resin ("V259PA" from Shin-Nittetsu Kagaku Co., Ltd.). The photo-thermosetting resin is incorporated with 5 wt % of fluorescent material (7-hy-droxy-4-methylcoumarin). This fluorescent material converts light (incident to the flattening layer 3) having a wavelength shorter than 420 nm into light having a wavelength longer than 420 nm.

The photo-thermosetting resin containing the fluorescent material is applied to the color filtering layer comprising 2R, 2G, and 2B. This coating step is followed by heating with a hot plate in the usual way. The coating is exposed to light and then heated for curing in an oven. Thus there is formed the flattening layer 3 (e.g., about 1.5 μm thick).

The above-mentioned steps gives the color filter in which the flattening layer functions also as the wavelength converting layer capable of changing the wavelength of incident light.

For the purpose of comparison, the flattening layer is formed from the photo-thermosetting resin containing no fluorescent material. The color filtering layer 2R, 2G, and 2B are formed using known conventional techniques.

Figure 3:
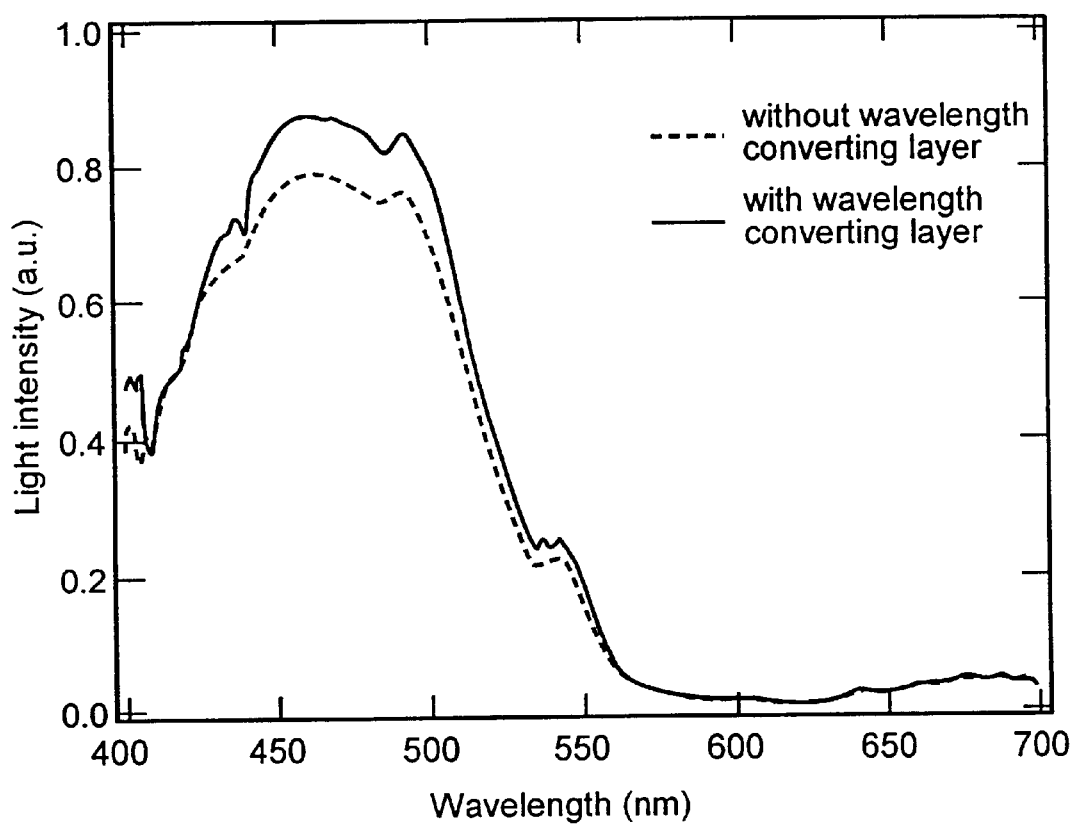
FIG. 3 is a spectrum produced by a color filter and is intended to explain the function of the wavelength converting layer.

FIG. 3 is a spectrum showing the spectral characteristics of the color filter produced as mentioned above. The color filter used for this test has only the blue filter segments 2B. The spectroscopy is carried out by allowing incident light 5 to enter the flattening layer 3 of the color filter. (This light is back-light commonly used for the liquid crystal display unit.) The emergent light 11 which has passed through the blue filter segments 2B and emerged from the glass substrate 4 is examined for intensity by using a multi-channel analyzer and an imaging spectrum graph C5094 (from Hamamatsu Photonics Co., Ltd.).

In FIG. 3, the abscissa represents the wavelength and the ordinate represents the intensity of emergent light. The solid line represents the spectrum which is obtained in the case where the incident light has passed through the wavelength converting layer which functions also as the flattening layer. The dotted line represents the spectrum which is obtained in the case where the incident light has passed through the flattening layer which does not function as the wavelength converting layer.

It is apparent from the above-mentioned result that the back-light which has passed through the flattening layer (or the wavelength converting layer) and the blue color filter segments undergoes the following change. That is, the wavelength converting layer absorbs that portion of the back-light which has a wavelength shorter than 420 nm and emits fluorescence having a wavelength longer than 420 nm. The result is a remarkable increase in the intensity of emergent light in the wavelength region longer than 420 nm, particularly in the range of 440 nm to 480 nm.

In the case where the color filter segment is a green filter 2G (center wavelength=550 nm) and a red green filter 2R (center wavelength=620 nm), the light in the wavelength region with a remarkable increase in the intensity of emergent light hardly passes through these filters 2G and 2R and hence these filters 2G and 2R do not function as the wavelength converting layer unlike the blue filter 2B.

As mentioned above, when the back light passes sequentially through the wavelength converting layer (which functions also as the flattening layer) and the color filter layer, that portion of the back light which has a wavelength shorter than 420 nm is converted into light having a wavelength longer than 420 nm. Thus, the incident light 5 emerges together with the emergent light 11.

Thus, the color filter with the wavelength converting layer is improved in brightness, and the wavelength converting layer for blue light covers the surface of the individual RGB filter segments, thereby flattening the surface of the filter. This permits the reduction of manufacturing steps.

Figure 4:
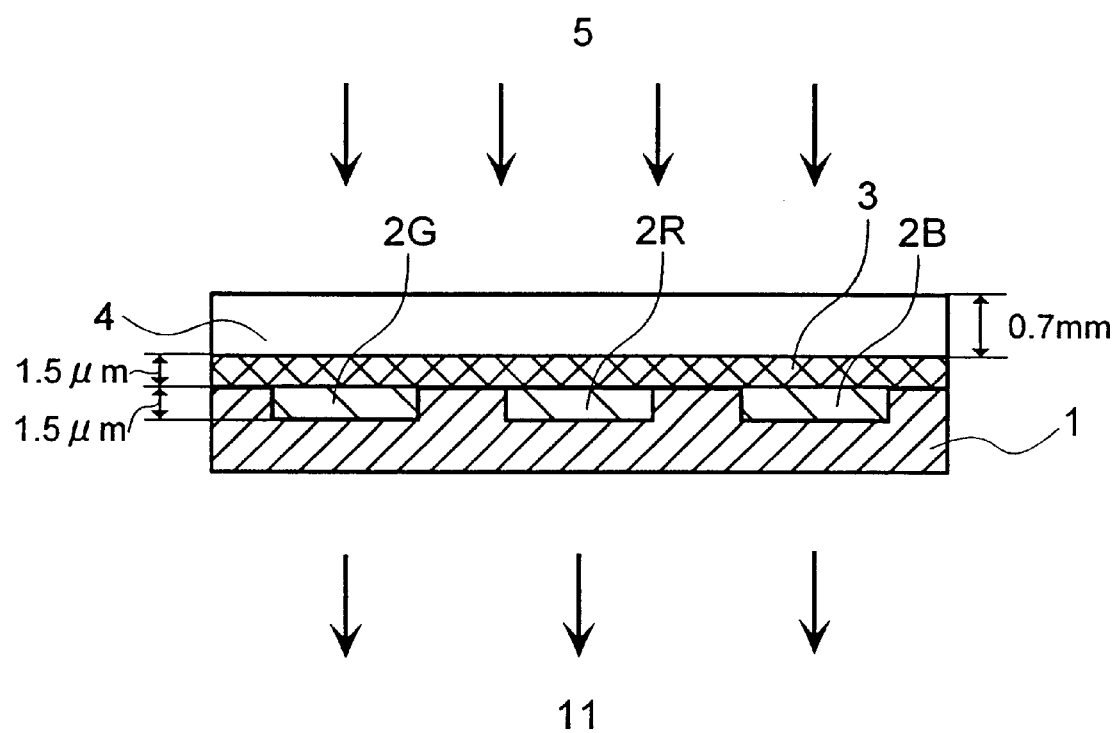
FIG. 4 is a sectional view illustrating a color filter according to another embodiment of the present invention.

FIG. 4 is a sectional view illustrating another embodiment of the present invention.

The glass substrate 4 (e.g., about 0.7 mm thick) is coated with a photo-thermosetting resin ("V259PA" from Shin-Nittetsu Kagaku Co., Ltd.). This photo-thermosetting resin contains 5 wt % of a fluorescent material which converts that portion of incident light which has a wavelength shorter than 420 nm into light having a wavelength longer than 420 nm. An example of this fluorescent material is 7-hydroxy-4-methyl-coumarin. The coating step is followed by heating with a hot plate, overall exposure, and reheating for curing in an oven. In this way there is formed the wavelength converting layer 3 (e.g., about 1.5 μm thick) comprised of the coat of photo-thermosetting resin.

Then, the wavelength converting layer 3 is coated with a resist containing a red pigment dispersed therein. Coating is followed by baking. The resist undergoes exposure, development, and post-baking according to the well-known technology of lithography. In this way there is formed the patterned red filter segments 2R (e.g., about 1.5 μm thick) at the desired positions which comprise the red filter portion of the color filtering layer.

In the same way as above the green filter segments 2G and the blue filter segments 2B are formed. Incidentally, there is no specific order of forming the filter layers. Then, the flattening layer 1 is formed in the usual way so that it covers the color filtering layer 2R, 2G, and 2B. In this way there is completed the color filter which is capable of converting the wavelength of the incident light 5.

The thus obtained color filter functions in the following way when the glass substrate 4 is illuminated with back light of the liquid crystal display unit. As back light enters the wavelength converting layer 3 through the glass substrate 4, the fluorescent material absorbs that portion of the back light which has a wavelength shorter than 420 nm and emits fluorescence having a wavelength longer than 420 nm. This fluorescence, along with the back light, passes through the blue filter segments 2B and emerges from the color filter (as indicated by emergent light 11).

Consequently, as shown in FIG. 3, light having a wavelength shorter than 420 nm is converted into light having a wavelength longer than 420 nm. This produces an effect of increasing the transmittance of the blue filter segments 2B. As the result, the color filter mentioned above increases brightness unlike the conventional color filter without the wavelength converting layer 3.

Figure 5:
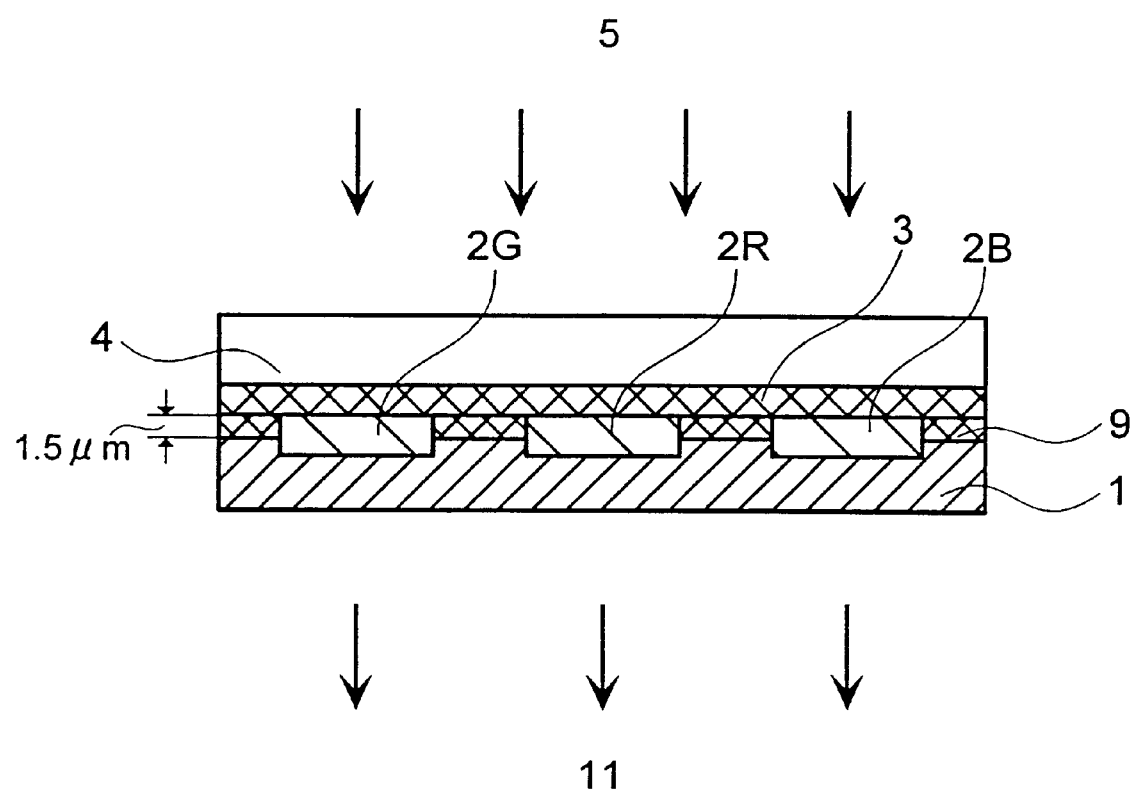
FIG. 5 is a sectional view illustrating a color filter according to another embodiment of the present invention.

FIG. 5 is a sectional view illustrating the color filter pertaining to another embodiment of the present invention.

This embodiment differs from the embodiment shown in FIG. 4 in that a step of forming the black matrix 9 is inserted between the step of forming the wavelength converting layer 3 and the step of forming the filter segments 2R, 2G, and 2B. The wavelength converting layer 3 and the filter segments 2R, 2G, and 2B are formed in the same way as mentioned above with reference to FIG. 4.

The black matrix layer 9 is formed in the following way. First, the wavelength converting layer 3 is formed on the glass substrate 4. Then a photosensitive resin for the black matrix is applied, and coating is followed by baking. The coating layer undergoes exposure, development, and post-baking according to the well-known technology of lithography. In this way there is formed the patterned black matrix layer 9 (e.g., about 1.5 μm thick) at the desired position.

The red filter segments 2R, the green filter segments 2G, and the blue filter segments 2B are formed in the openings of the black matrix layer 9. The flattening layer 1 is formed so as to cover color filtering layer (comprising the red filter segments 2R, the green filter segments 2G, the blue filter segments 2B), and the black matrix layer 9. Upon completion of the above-mentioned steps, there is obtained the color filter having a wavelength converting layer in accordance with the invention.

The thus obtained color filter functions in the following way when the glass substrate 4 is illuminated with back light of the liquid crystal display unit. As back light enters the wavelength converting layer 3 through the glass substrate 4, the fluorescent material absorbs that portion of the back light which has a wavelength shorter than 420 nm and emits fluorescence having a wavelength longer than 420 nm. This fluorescence, along with the back light, passes through the filter segments 2R, 2G, and 2B and the flattening layer 1 and emerges from the color filter (as indicated by emergent light 11).

In this process, the incident light 5 from the back light and part of the light converted by the wavelength converting layer 3 are screened by the black matrix layer 9. This prevents the emergent red, green, and blue light (that have passed the respective filter segments 2R, 2G, and 2B) from mixing together.

In other words, the black matrix layer placed in the gap between the adjacent filter layers improves the contrast unlike the conventional color filter. In addition, the color filter with the wavelength converting layer improves brightness.

Figure 6:
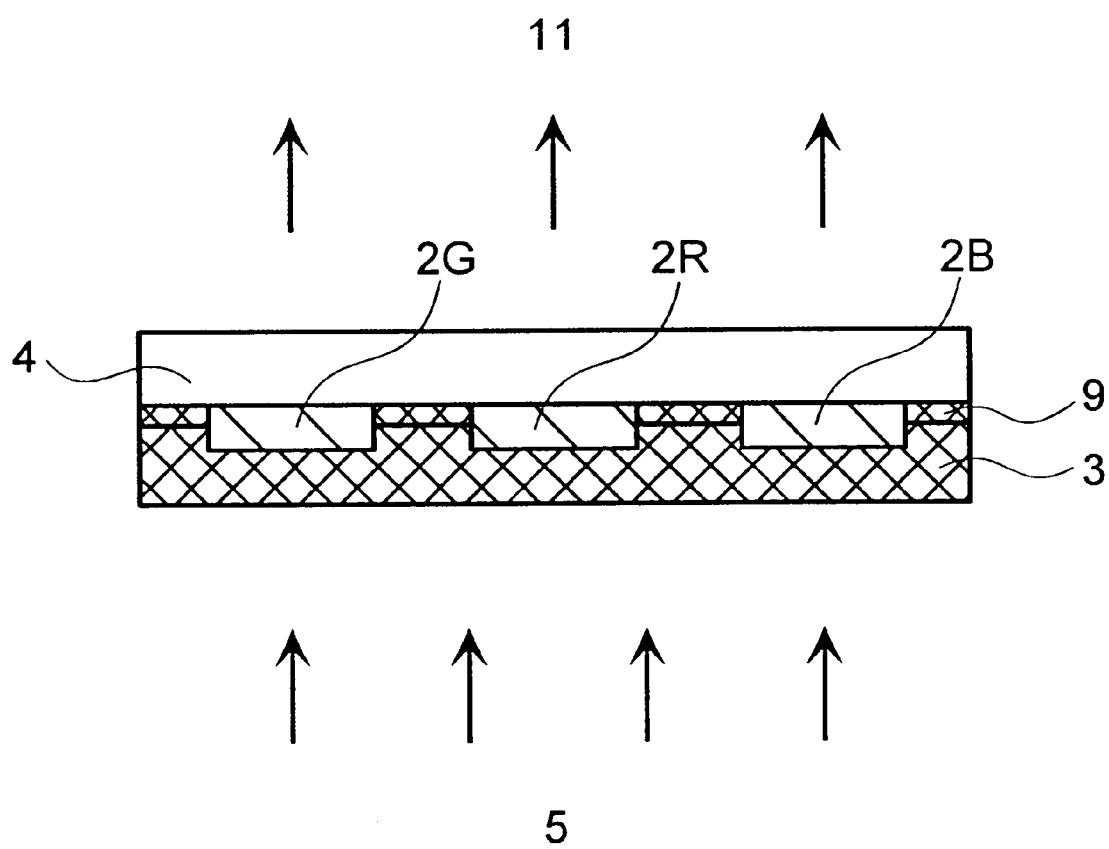
FIG. 6 is a sectional view illustrating a color filter according to another embodiment of the present invention.

FIG. 6 is a sectional view illustrating the color filter pertaining to another embodiment of the present invention.

This embodiment differs from the embodiment explained with reference to FIG. 2 in that the black matrix layer 9 is formed first at the prescribed position on the glass substrate 4 and then the filter segments 2R, 2G, and 2B are formed in the respective openings of the black matrix 9. In other words, the black matrix layer 9 is arranged in the gap between the adjacent filter segments 2R, 2G, and 2B which constitute the color filtering layer.

Incidentally, the black matrix layer 9 is formed in the same way as in the embodiment explained with reference to FIG. 5. Likewise, the filter segments 2R, 2G, and 2B and the flattening layer 3 (which functions also as the wavelength converting layer) are formed in the same way as in the embodiment explained with reference to FIG. 2.

When the above-mentioned color filter is irradiated with light from the back light for the liquid crystal display unit through the back side of the glass substrate (or through the flattening layer 3 which functions also as the wavelength converting layer), that portion of the incident light 5 which has a wavelength shorter than 420 nm is converted into light having a wavelength longer than 420 nm. The light which has changed in wavelength passes through the filter segments 2R, 2G, and 2B and emerges from the color filter (as indicated by emergent light 11).

As in the color filter of the embodiment shown in FIG. 2, the color filter of this embodiment is improved in brightness owing to the wavelength converting function of the wavelength converting layer, unlike the conventional color filter. Moreover, the black matrix layer 9 screens the incident light 5 from the back light and the light which has been converted by the wavelength converting layer 3. Therefore, the color filter improves the contrast of the emergent light from the filter segments 2R, 2G, and 2B, unlike the color filter of the embodiment shown in FIG. 2.

The wavelength converting layer which functions also as the flattening layer helps improve brightness without the necessity of increasing the number of manufacturing steps.

Figure 7:
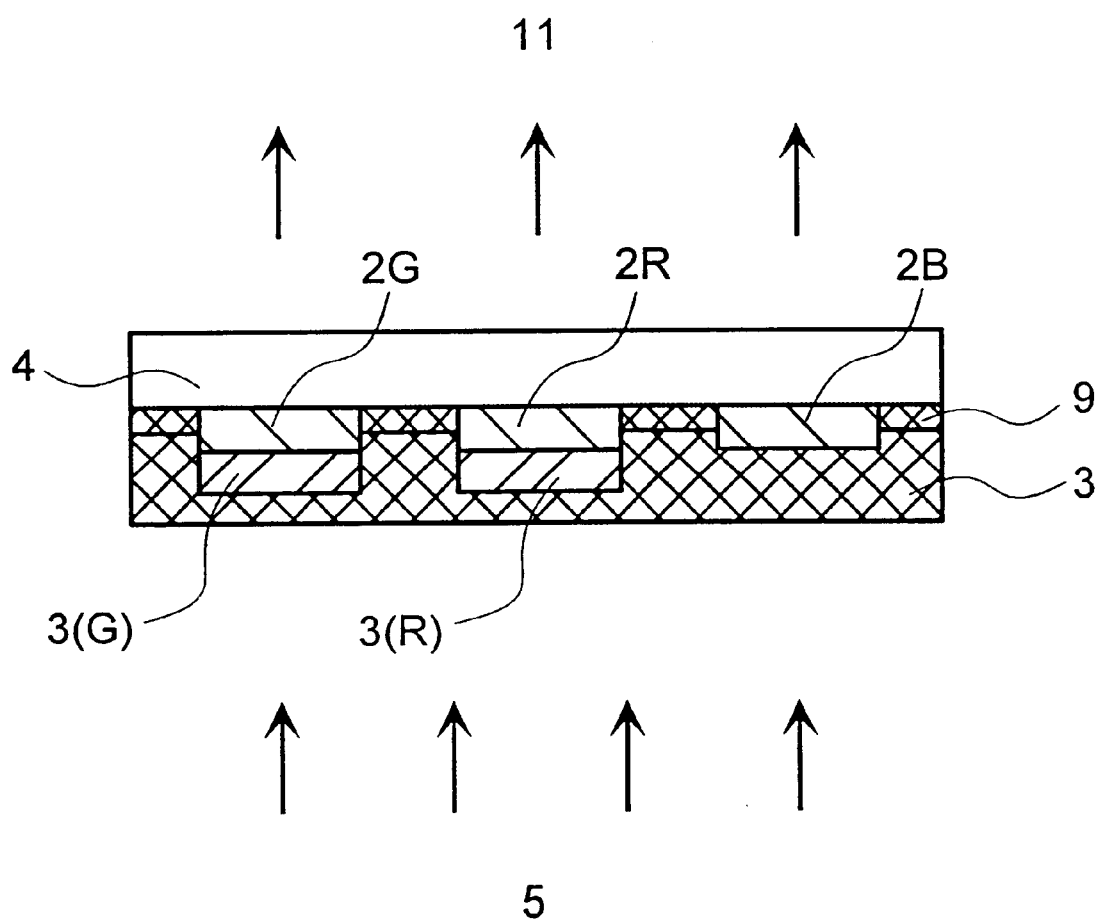
FIG. 7 is a sectional view illustrating a color filter according to another embodiment of the present invention.

FIG. 7 is a sectional view illustrating the color filter pertaining to another embodiment of the present invention.

This embodiment differs from that shown in FIG. 6 in that the wavelength converting layer comprising wavelength converting segments 3R and 3G are formed on the patterns 2R and 2G of the color filter.

Incidentally, the black matrix layer 9 is formed in the same way as in the embodiment explained with reference to FIG. 5. Likewise, the filter segments 2R, 2G, and 2B are formed in the same way as in the embodiment explained with reference to FIG. 2.

The wavelength converting layer 3R is formed from a photo-thermosetting resin ("V259PA" from Shin-Nittetsu Kagaku Co., Ltd.). This photo-thermosetting resin contains 5 wt % of a fluorescent material which converts that portion of incident light which has a wavelength shorter than 550 nm into light having a wavelength longer than 550 nm. An example of this fluorescent material is 4-dicyanomethylene-2-methyl-6-(4-dimethylstyryl)-4H-pyran.

The photo-thermosetting resin containing the fluorescent material is applied to the entire surface of the color filter. Coating is followed by heating with a hot plate. The coating layer is exposed through a mask which is used to form 2R. Exposure is followed by development and post-baking by the well-known technology of lithography. In this way there is formed layer 3R (e.g., about 1.5 $\mu$m thick).

The wavelength converting layer 3G is formed from a fluorescent coumarin 30 in the same way as mentioned above. It converts that portion of the incident light which has a wavelength shorter than 480 nm into light having a wavelength longer than 480 nm.

Then, the flattening layer 3 is formed so as to cover the color filter layer and the wavelength converting layer. It converts light having a wavelength shorter than 420 nm into light having a wavelength longer than 420 nm. The flattening layer 3 is formed in the same way as in the embodiment shown in FIG. 2.

When the above-mentioned color filter is irradiated with light from the back light for the liquid crystal display unit through the flattening layer of the color filter, the fluorescent material contained in the wavelength converting layer 3 absorbs that portion of the incident light 5 passing through the flattening layer 3 which has a wavelength shorter than 420 nm and emits fluorescence and converts it into light having a wavelength longer than 420 nm. The light which has changed in wavelength passes through the filter layer 2B and emerges from the color filter (as indicated by emergent light 11). The fluorescent material in segments 3R and 3G absorbs the incident light 5 entering segments 3R and 3G and the incident light which has been converted into light having a wavelength longer than 420 nm and emits fluorescence, thereby converting the incident light into light having a wavelength longer than 550 nm and a wavelength longer than 480 nm. The converted light passes through the filter segments 2R and 2G and emerges from the color filter (as indicated by emergent light 11).

The color filter pertaining to this embodiment has a higher brightness than that pertaining to the embodiment shown in FIG. 6 or than the conventional color filter, owing to the wavelength converting function of the wavelength converting layer. The wavelength converting layer, which functions also as the flattening layer, helps improve brightness without the necessity of increasing the number of manufacturing steps.

Figure 8:
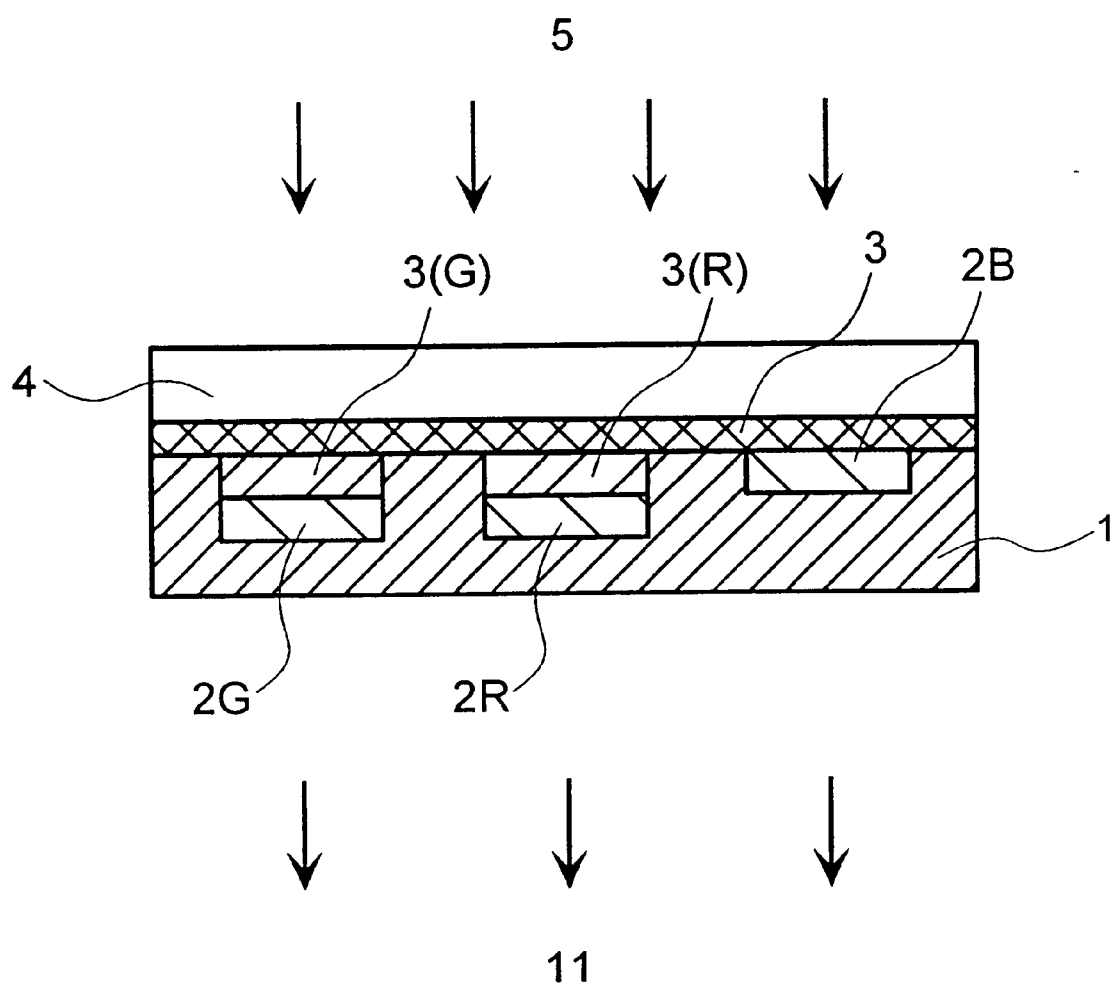
FIG. 8 is a sectional view illustrating a color filter according to another embodiment of the present invention.

FIG. 8 is a sectional view illustrating the color filter pertaining to another embodiment of the present invention.

This embodiment differs from that shown in FIG. 5 in that the wavelength converting layer comprising wavelength converting segments 3R and 3G are formed on the underside of the patterns 2R and 2G of the color filter.

Incidentally, the black matrix layer 9 is formed in the same way as in the embodiment explained with reference to FIG. 5. The wavelength converting segments 3R and 3G are formed in the same way as shown in FIG. 7. The filter segments 2R, 2G, and 2B and the wavelength converting layer 3 are formed in the same way as in the embodiment explained with reference to FIG. 5.

When the color filter prepared as mentioned above is irradiated with light from the back light for the liquid crystal display unit through the glass substrate 4, the fluorescent material contained in the wavelength converting layer 3 absorbs that portion of the incident light 5 passing through the glass substrate 4 which has a wavelength shorter than 420 nm and emits fluorescence and converts it into light having a wavelength longer than 420 nm. The light which has changed in wavelength passes through the filter layer 2B and emerges from the color filter (as indicated by emergent light 11). The fluorescent material in segments 3R and 3G absorbs the incident light 5 entering segments 3R and 3G and the incident light which has been converted into light having a wavelength longer than 420 nm and emits fluorescence, thereby converting the incident light into light having a wavelength longer than 550 nm and a wavelength longer than 480 nm. The converted light passes through the filter segments 2R and 2G and emerges from the color filter (as indicated by emergent light 11).

The color filter pertaining to this embodiment has a higher brightness than that pertaining to the embodiment shown in FIG. 5 or than the conventional color filter, owing to the wavelength converting function of the wavelength converting layer.

Figure 9:
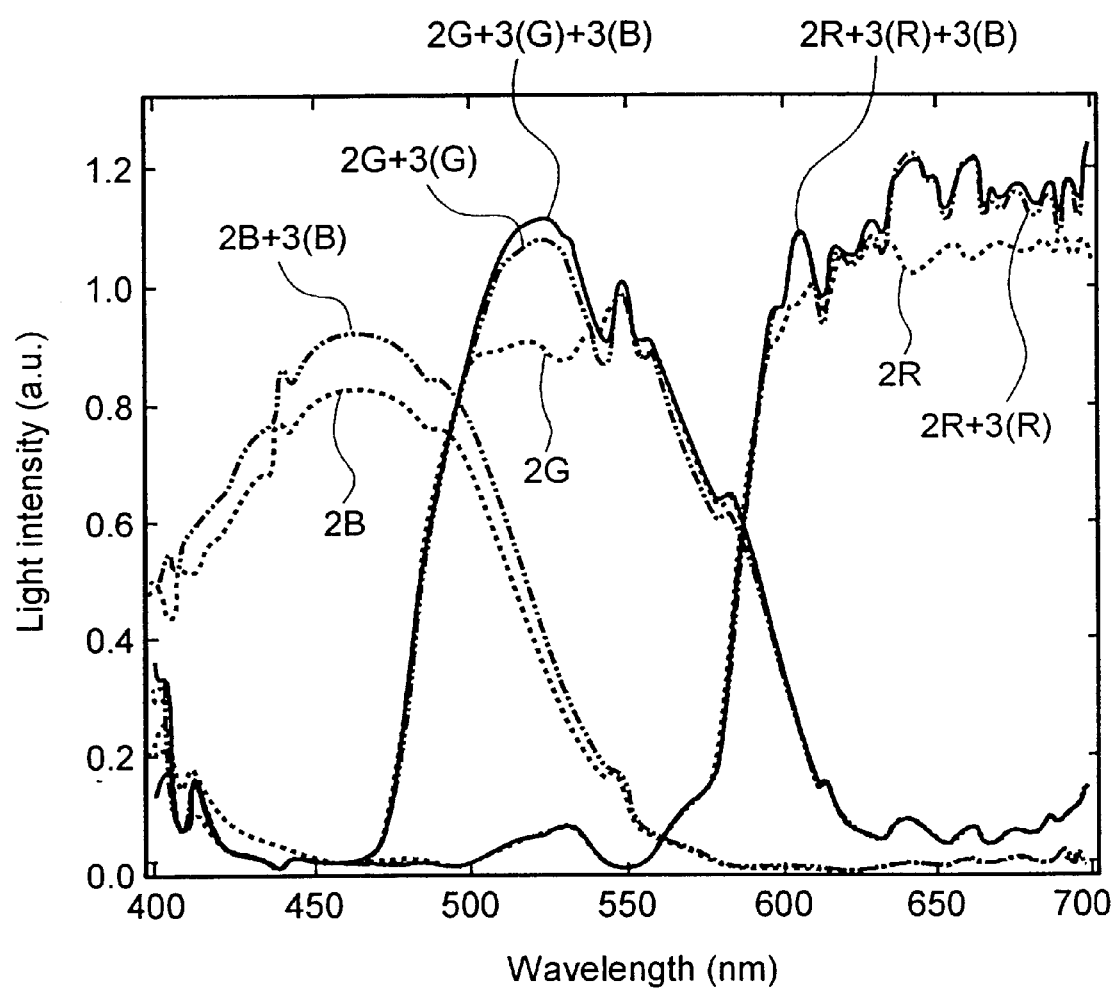
FIG. 9 is a spectrum produced by a color filter and is intended to explain the function of the wavelength converting layer.

FIG. 9 is a spectrum showing the spectral characteristics of the color filter produced as mentioned above. The spectroscopy is carried out by allowing light to enter the flattening layer 3 of the color filter. (This light is back-light commonly used for the liquid crystal display unit.) The light which has passed through the blue filter layer 2B and emerged from the glass substrate 4 is examined for intensity in the same way as in the case of FIG. 3.

In FIG. 9, the abscissa represents the wavelength and the ordinate represents the intensity of emergent light. The dotted lines 2R, 2G, and 2B each represents the spectrum of the light which has passed through a mere flattening layer (which has no wavelength converting function) and the filter segments R, G, and B. The two-dot chain lines 2R+3(R), 2G+3(G), and 2B+3(B) represent the spectra obtained in the case where the filter layer is provided with the wavelength converting layer. The solid lines 2R+3(R)+3(B) and 2G+3(G)+3(B) represent the spectrum of the light which has passed through the wavelength converting layer for B (which functions also as the flattening layer) and the wavelength converting segments for R and G.

It is apparent from the above-mentioned result that the back-light which has passed through the flattening layer (or the wavelength converting layer) and the blue color filter layer undergoes the following change. That is, the wavelength converting layer absorbs that portion of the back-light which has a wavelength shorter than 420 nm and emits fluorescence having a wavelength longer than 420 nm. The result is a remarkable increase in the intensity of emergent light in the wavelength region longer than 420 nm. Consequently, the wavelength converting layer formed on the R and G filter segments increase the intensity of emergent light more than in the case where the light in the wavelength region for remarkable increase in the intensity of emergent light passes through the filters 2G and 2R and the wavelength converting layer is formed only on the blue filter 2B.

As mentioned above, when the back light passes sequentially through the wavelength converting layer (which functions also as the flattening layer) and the color filter layer, that portion of the back light which has a wavelength shorter than 420 nm is converted into light having a wavelength longer than 420 nm. Thus, the incident light 5 emerges together with the emergent light 11.

Thus, the color filter with the wavelength converting layer is improved in brightness, and the wavelength converting layer for blue light covers the surface of the individual RGB filters, thereby flattening the surface of the filter. This permits the reduction of manufacturing steps.

A mention is made below of the liquid crystal display provided with the above-mentioned color filter.

Figure 10:
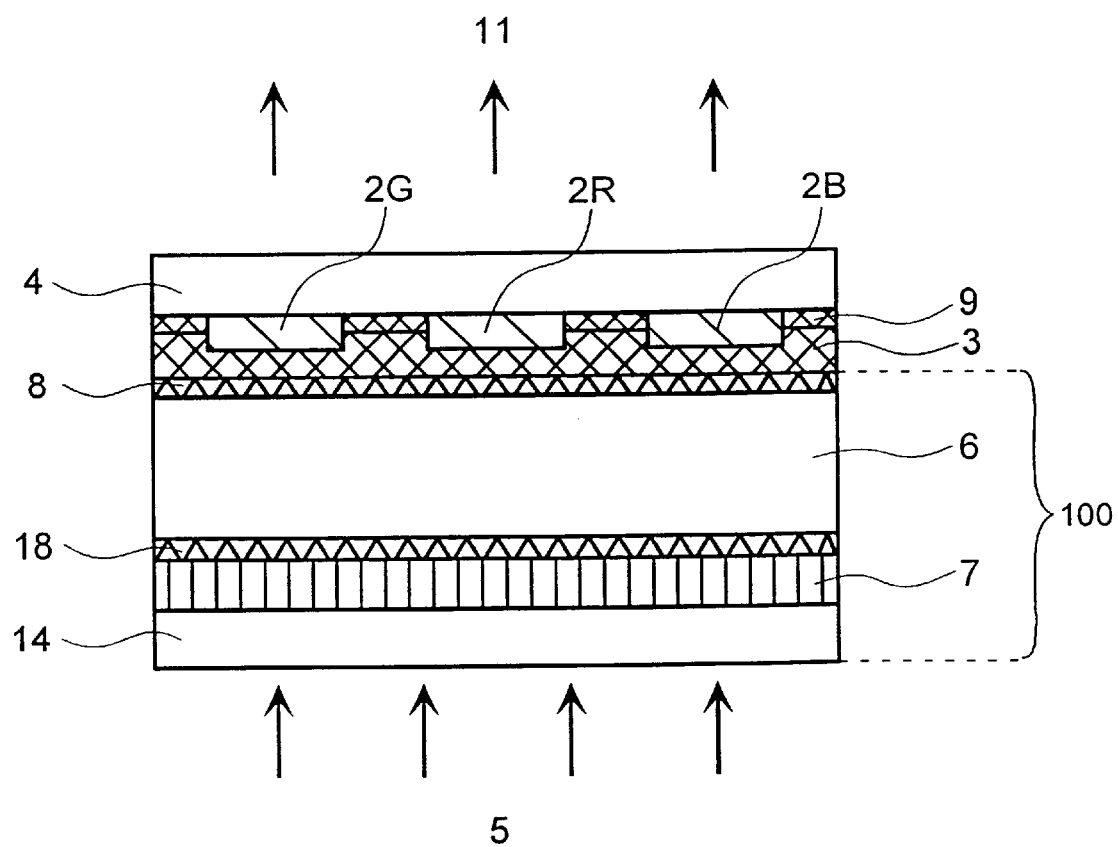
FIG. 10 is a sectional view illustrating a liquid crystal display unit according to one embodiment of the present invention.

FIG. 10 is a sectional view showing the liquid crystal display unit 100 provided with the color filter shown in FIG. 6. The same procedure as explained with reference to FIG. 6 is used to form the filter segments 2R, 2G, and 2B on the second glass substrate 4, the black matrix layer 9 arranged in the gap between the adjacent filter segments 2R, 2G, and 2B, and the flattening layer 3 (which functions also as the wavelength converting layer) covering the above-mentioned filter segments 2R, 2G, and 2B and the black matrix layer 9.

Subsequently, on the flattening layer 3 is formed the polyimide alignment layer 8 to orient the liquid crystal 6.

On the other hand, on the first glass substrate 14 are formed the TFT elements 7 and the polyimide alignment layer 18 by well-known methods. The pixel regions (not shown) of the TFT elements 7 are positioned corresponding to the filter segments 2R, 2G, and 2B.

Then, the above-mentioned two glass substrates 4 and 14 are arranged such that the polyimide alignment layers 8 and 18 face each other. The peripheries of the glass substrates 4 and 14 are sealed with a sealant so that the liquid crystal 6 is held between them. In this way the liquid crystal display unit 100 is completed.

The back light is arranged on the side of the first glass substrate 14 on which the TFT elements 7 are arranged. The back light is not shown in FIG. 10.

The TFT elements are driven in the usual way, and a prescribed electric field is applied across the liquid crystal 6. The incident light 5 from the back light enters the first glass substrate 14, passes through the alignment layer 18, the liquid crystal 6, and the alignment layer 8, and reaches the wavelength converting layer 3 which functions also as the flattening layer. The fluorescent material in the wavelength converting layer 3 is excited by that portion of the incident light which has a wavelength shorter than 420 nm, and it emits light having a wavelength longer than 420 nm. (See FIG. 3.) The light which has changed in wavelength passes, together with the light from the back light, through the filter segments 2R, 2G, and 2B, and finally emerges from the filter segments.

The fact that the light from the back light passes through the wavelength converting layer containing a fluorescent material before it enters the filter layer is the reason why the intensity of emergent light having wavelengths in the range of 440 nm to 480 nm remarkably increases unlike the conventional color filter having no wavelength converting layer. Therefore, the thus obtained liquid crystal display unit is improved in brightness, which is one of the most important characteristics required of the display unit for character information and image information.

Figure 11:
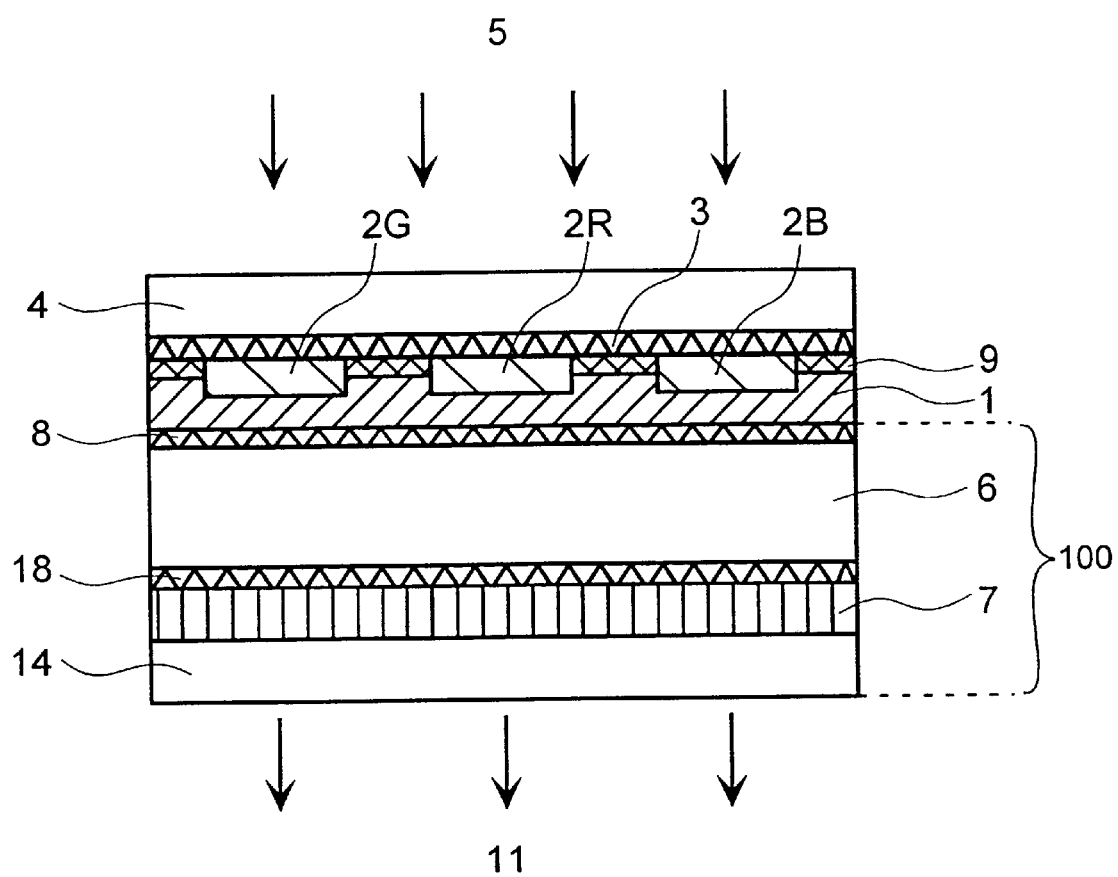
FIG. 11 is a sectional view illustrating a liquid crystal display unit according to another embodiment of the present invention.

FIG. 11 is a sectional view illustrating the liquid crystal display pertaining to another embodiment of the present invention.

This liquid crystal display shown in FIG. 11 differs from that shown in FIG. 10 in that it is provided with the color filter shown in FIG. 5. Therefore, the wavelength converting layer 3 is arranged between the second glass substrate 4 and the filter segments 2R, 2G, and 2B. The back light (not shown) is arranged on the side of the second glass substrate 4.

On account of the above-mentioned structure, the incident light 5 from the back light enters the second glass substrate 4, passes through the wavelength converting layer 3, the filter segments 2R, 2G, and 2B, the flattening layer 1, the alignment layer 8, the liquid crystal 6, the alignment layer 18, the TFT elements, and the first glass substrate 14, and emerges from the liquid crystal display unit 100.

As in the embodiment shown in FIG. 7, the liquid crystal display unit permits the emergent light to be combined with light whose wavelength has been changed by the wavelength converting layer, unlike a liquid crystal display unit provided with a color filter having no wavelength converting layer.

The fact that the light from the back light passes through the wavelength converting layer containing a fluorescent material before it enters the filter layer is the reason why the intensity of emergent light having wavelengths in the range of 440 nm to 480 nm remarkably increases. Therefore, the thus obtained liquid crystal display unit is improved in brightness, which is one of the most important characteristics required of the display unit for character information and image information.

Figure 12:
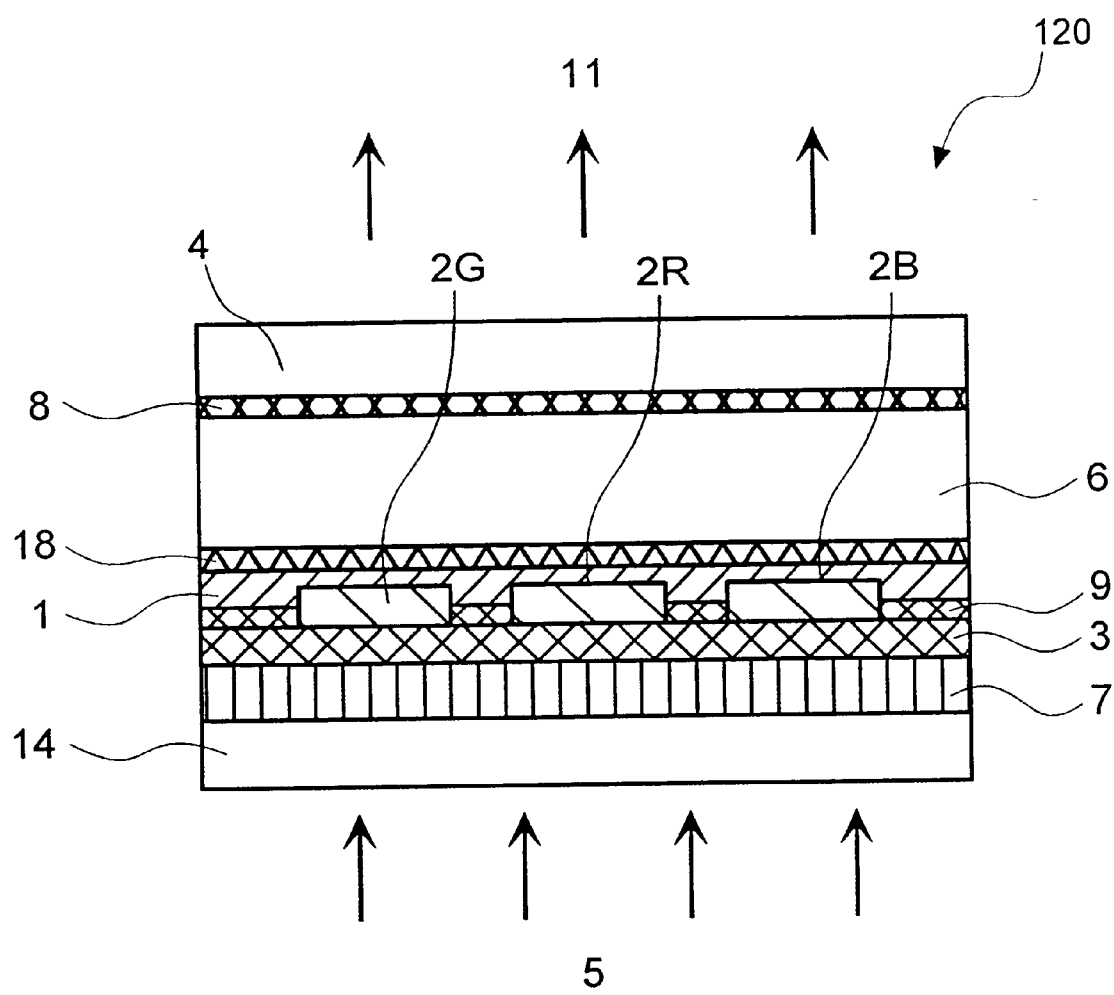
FIG. 12 is a sectional view illustrating a liquid crystal display unit according to another embodiment of the present invention.

FIG. 12 is a sectional view illustrating the liquid crystal display pertaining to another embodiment of the present invention.

This liquid crystal display 120 shown in FIG. 12 differs from that shown in FIG. 10 or FIG. 11 in that it has the color filter on the TFT elements 7 comprising the liquid display, said color filter having the wavelength converting layer 3, the filter segments 2R, 2G, and 2B, the matrix layer 9, and the flattening layer 1.

The TFT elements are formed on the first glass substrate 14 by the method used in the embodiment explained with reference to FIG. 10 or FIG. 11. Then, the wavelength converting layer 3, the filter segments 2R, 2G, and 2B, the black matrix layer 9, the color filter having the flattening layer 1 are formed by the method used in the embodiment explained with reference to FIG. 5. The pixel regions (not shown) of the TFT elements 7 are positioned corresponding to the filter segments 2R, 2G, and 2B.

The alignment layer 18 is formed on the above-mentioned flattening layer 1. The alignment layer 8 is formed on the second glass substrate 4. Then, the above-mentioned two glass substrates 4 and 14 are arranged such that the alignment layers 8 and 18 face each other and the liquid crystal 6 is held between them. In this way the liquid crystal display unit 120 is completed.

The back light (not shown) is arranged on the side of the second glass substrate 14. The incident light 5 from the back light passes through the first glass substrate 14, the TFT elements 7, the wavelength converting layer 3, the filter segments 2R, 2G, and 2B, the flattening layer 1, the alignment layer 18, the liquid crystal 6, the alignment layer 8, and the second glass substrate 4, and emerges from the liquid crystal display unit (as indicated by emergent light 11).

On account of the above-mentioned structure, the liquid crystal display unit permits the incident light 5 to combine with the light whose wavelength has been changed by the wavelength converting layer 3. Particularly, the liquid crystal display unit remarkably increases the intensity of the emergent light in the wavelength region from 440 nm to 480 nm. Therefore, the thus obtained liquid crystal display unit is improved in brightness, which is one of the most important characteristics required of the display unit for character information and image information.

In addition, the fact that the color filter containing the wavelength converting layer 3 etc. is formed directly on the TFT elements 7 makes it easier to align the filter segments 2R, 2G, and 2B with the pixel regions of the TFT elements 7 as compared with the embodiment shown n FIG. 10 or FIG. 11. This prevents the reduction of light transmittance or color irregularity due to dislocation.

The above-mentioned illustrative embodiments of the present invention are not limitative. As mentioned above, it is possible to improve brightness without loss in color purity by converting a portion of incident light into light having a specific wavelength region. While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications as fallen within the ambit of the appended claims.

What is claimed is:

1. A method for fabricating a color filter comprising:
   forming a transparent substrate layer;
   forming a color filtering layer on said transparent substrate layer, said color filtering layer comprising a plurality of substantially coplanar color filtering segments; and
   forming a flattening layer on and substantially co-extensive with said color filtering layer, said flattening layer including a single kind of material having a wavelength converting property, said flattening layer being a single layer of material.

2. The method of claim 1 wherein said forming a color filtering layer includes forming an opaque layer on said transparent substrate layer, forming a pattern of openings through said opaque layer to expose portions of said transparent substrate layer, and forming said color filtering segments in said openings.

3. The method of claim 1 wherein said single kind of material is selected from the group consisting of: 7-dimethylamino-4-methylcoumarin, 7-hydroxy-4-methylcoumarin, perylene, 1,4-bis(4-methyl-5-phenylxazol-2-yl)benzene and 7-dimethylamino-4-methyl-2-hydroxyquinoline.

4. A method for fabricating a color filter comprising:
   forming a transparent substrate layer;
   forming a wavelength converting layer on and substantially co-extensive with said transparent substrate layer, said wavelength converting layer including a single kind of material having a wavelength converting property, said wavelength converting layer being a continuous layer of material;
   forming a color filtering layer on said wavelength converting layer; and
   forming a flattening layer on said color filtering layer.

5. The method of claim 4 wherein said forming a color filtering layer includes forming an opaque layer on said wavelength converting layer, forming a pattern of openings through said opaque layer to expose portions of said wavelength converting layer, and forming a plurality of color filtering segments in said openings.

6. The method of claim 4 wherein said single kind of material is selected from the group consisting of: 7-dimethylamino-4-methylcoumarin, 7-hydroxy-4-methylcoumarin, perylene, 1,4-bis(4-methyl-5-phenylxazol-2-yl)benzene and 7-dimethylamino-4-methyl-2-hydroxyquinoline.

7. A method for making a color filter comprising:

forming a light transmissive layer;

forming a plurality of color filtering segments on a major surface of said light transmissive layer;

forming a plurality of first and second wavelength converting segments on less than all of said color filtering segments, thus leaving a plurality of exposed color filtering segments; and forming a wavelength converting layer as a single layer of material over at least said first and second wavelength converting segments and said exposed color filtering segments, said first wavelength converting segments effective for producing first emergent light having a first range of wavelengths greater than a first wavelength value in response to exposure to a first portion of incident light having wavelengths less than said first wavelength value, said second wavelength converting segments effective for producing second emergent light having a second range of wavelengths greater than a second wavelength value in response to exposure to a second portion of said incident light having wavelengths less than said second wavelength value, said wavelength converting layer being a single layer of material, said wavelength converting layer effective for producing third emergent light having a third range of wavelengths greater than a third wavelength value in response to exposure to a third portion of said incident light having wavelengths less than said third wavelength value.

8. The method of claim 7 further including forming an opaque layer on said major surface of said light transmissive layer, forming a plurality of openings in said opaque layer to expose said major surface therethrough, and forming said plurality of color filtering segments in said openings.

9. A method for making a color filter comprising:

forming a light transmissive layer;

forming a wavelength converting layer on and co-extensive with said light transmissive layer;

forming a plurality of first and second wavelength converting segments on said wavelength converting layer;

forming a first plurality of color filtering segments on said first and second wavelength converting segments;

forming a second plurality of color filtering segments on said wavelength converting layer; and forming a flattening layer at least over said first and second wavelength converting segments and over said second plurality of color filtering segments, said first wavelength converting segments effective for producing first emergent light having a first range of wavelengths greater than a first wavelength value in response to exposure to a first portion of incident light having wavelengths less than said first wavelength value, said second wavelength converting segments effective for producing second emergent light having a second range of wavelengths greater than a second wavelength value in response to exposure to a second portion of said incident light having wavelengths less than said second wavelength value, said wavelength converting layer being a single layer of material, said wavelength converting layer effective for producing third emergent light having a third range of wavelengths greater than a third wavelength value in response to exposure to a third portion of said incident light having wavelengths less than said third wavelength value.

* * * * *